W. G. ROEPE & F. J. CASSING.
NUT LOCK.
APPLICATION FILED MAR. 14, 1916.
1,191,096.
Patented July 11, 1916.
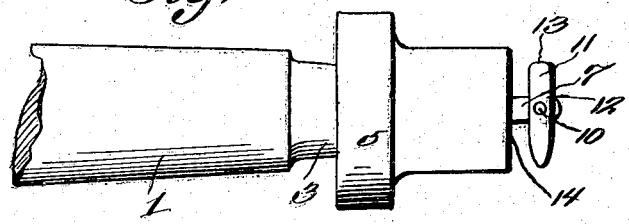
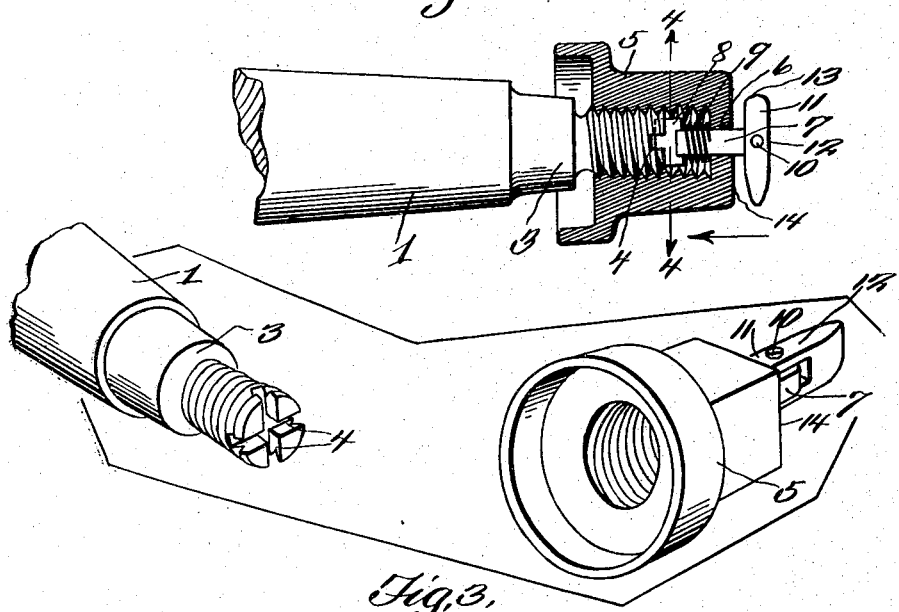
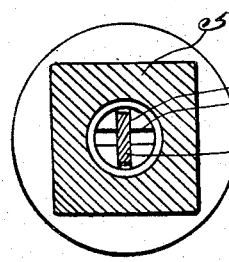
Witnesses
Inventors
W. G. Roepe
F. J. Cassing,
By D. Swift &C.,
their Attorneys

UNITED STATES PATENT OFFICE.

WALTER G. ROEPE AND FREDERICK J. CASSING, OF CONCORDIA, MISSOURI.

NUT-LOCK.

1,191,096. Specification of Letters Patent. Patented July 11, 1916.

Application filed March 14, 1916. Serial No. 84,099.

*To all whom it may concern:*

Be it known that we, WALTER G. ROEPE and FREDERICK J. CASSING, citizens of the United States, residing at Concordia, in the county of Lafayette, State of Missouri, have invented a new and useful Nut-Lock; and we do hereby declare the following to be a full, clear, and exact description of the invention, such as will enable others skilled in the art to which it appertains to make and use the same.

This invention relates to the art of nut locks, and more especially to a nut lock designed for use in connection with vehicle axles, and one of the objects of the invention is to provide a device of this kind, whereby the nut may be locked in several positions on the end of the axle, without turning the nut tightly home.

Another object of the invention is to provide a nut lock involving improved features of construction.

One of the features of construction is the provision of a nut of the kind, more especially for use on either end of the vehicle axle, having a rectangular opening in the outer end of the nut, in which a spring tensioned detent is mounted, so that the inner end of the detent will engage the right angularly or diametrically oppositely disposed slots or grooves in the end of the axle to lock the nut in place, there being a forked member pivoted to the extremity of the detent for withdrawing the detent from engagement with said slots or grooves.

In practical fields the details of construction may necessitate alterations, falling within the scope of what is claimed.

The invention comprises further features and combination of parts, as hereinafter set forth, shown in the drawings and claimed.

In the drawings: Figure 1 is a view in side elevation of a portion of a vehicle axle showing the spindle thereof, and illustrating the nut lock as applied to the threaded reduced extension or pintle of the spindles. Fig. 2 is a sectional view longitudinally through Fig. 1. Fig. 3 illustrates collective views of the extremity of the spindle and the nut lock (which is in sectional perspective) illustrating the latter in position to be threaded upon the former, illustrating the spring tensioned detent and the forked member for withdrawing the detent from one or the other of the grooves or slots. Fig. 4 is a sectional view in line 4—4 of Fig. 2.

Referring more especially to the drawings, 1 designates a portion of a vehicle axle, which is provided with a spindle 2 having a reduced axial extension or pintle 3, the face at the extremity of which is provided with right angularly or diametrically disposed grooves or slots 4, and 5 denotes the usual form of vehicle axle nut, to be threaded upon the reduced extension or pintle. In the end face of the nut 5 a rectangular opening 6 is provided, in which the shank 7 (which is rectangular in cross section) of the detent 8 is mounted. Between the detent 8 (which is in the form of a blade, to engage either of the grooves or slots of the extremity of the pintle or reduced extension) and the inner end face of the nut is a coil spring 9, acting to hold the detent in one or the other of said slots or grooves. Pivotally mounted by means of the pins 10 to the outer extremity of the shank are the forks 11 of the cam lever 12, the inner curved cam extremities 13 of which forks, designed to cam against the outer end face 14 of the nut, when the lever is thrown in one direction or the other, to withdraw the detent from either of the slots or grooves. In applying the nut to the reduced threaded extension, the lever is tilted upon its pivot in order to aline with the shank of the detent, thereby moving the detent toward the interior end face of the nut. The nut is then screwed upon the reduced extension or pintle until the slotted end face of the pintle does not quite engage the detent, and so that one of the slots or grooves is in registration with the detent, subsequently to which the lever is tilted upon its pivot to its normal position, thereby allowing the detent to engage the groove or slot with which it registers, thereby preventing the nut from unscrewing. By tilting the lever on the pivot causing the inner extremities of the forks of the lever to cam upon the exterior end face of the nut, the detent may be withdrawn from its groove or slot.

The invention having been set forth, what is claimed as new and useful is:

1. In a device of the kind set forth, the combination with a bolt having diametrically arranged slots at its extremity, of a nut having a rectangular opening in its extreme end wall, a spring tensioned detent mounted in said opening of the nut and designed to engage one or the other of the slots of the bolt, and means carried by the exterior end of the detent to engage the extreme outer end face of the nut for withdrawing the detent from the groove or slot with which it engages.

2. In a device of the kind specified, the combination with a bolt having diametrically arranged slots at the end extremity of the bolt, of a nut having a rectangular opening in the extreme end wall of the nut, a detent designed to engage either one of the slots and having its rectangular shank engaging through a rectangular opening of the nut, tensioning means for the detent, and a lever carried by the exterior extremity of the shank of the detent to cam against end surface of the nut to withdraw the detent from one of the slots.

3. In a device of the kind specified, the combination with a bolt having its extreme end face provided with grooves intersecting each other and extending at right angles, of a nut having a rectangular opening in the extreme end wall of the nut, a flat detent blade designed to engage either one of said grooves, said detent blade having a shank rectangular in cross section passing through the rectangular groove of the nut, a spring interposed between the blade and the inner end face of the nut to hold the detent blade in its groove, a lever having forks pivoted upon the exterior end extremity of the shank, the inner extremities of the forks having cammed ends to cam in either direction against the exterior end face of the nut to withdraw the detent blade from one or the other of said grooves.

In testimony whereof we have signed our names to this specification in the presence of two subscribing witnesses.

WALTER G. ROEPE.
FRED. J. CASSING.

Witnesses:
OTTO BREDEHOFT,
JULIUS ROEPE.

Copies of this patent may be obtained for five cents each, by addressing the "Commissioner of Patents, Washington, D. C."